Oct. 28, 1969  G. P. ESCHENBRENNER ET AL  3,475,136
APPARATUS FOR EFFECTING CATALYTIC REACTIONS
AT ELEVATED PRESSURES
Filed May 3, 1966  2 Sheets-Sheet 1

INVENTORS
GUNTHER P. ESCHENBRENNER,
CHARLES A. HONIGSBERG
BY John C. Quinlan
Don H. Phillips
ATTORNEYS INVENTORS
GUNTHER P. ESCHENBRENNER,
CHARLES A. HONIGSBERG
BY John C. Quinlan
Don H. Phillips
ATTORNEYS United States Patent Office 3,475,136
Patented Oct. 28, 1969

3,475,136
APPARATUS FOR EFFECTING CATALYTIC REACTIONS AT ELEVATED PRESSURES
Gunther P. Eschenbrenner, Cos Cob, Conn., and Charles A. Honigsberg, Jackson Heights, N.Y., assignors to Pullman Incorporated, Chicago, Ill., a corporation of Delaware
Filed May 9, 1966, Ser. No. 548,630
Int. Cl. B01j 9/04
U.S. Cl. 23—289                                                   11 Claims

ABSTRACT OF THE DISCLOSURE

Apparatus for effecting exothermic gaseous reactions at elevated temperatures and pressures in the presence of a subdivided contact material which must from time to time be withdrawn from the apparatus and replaced with a fresh charge of contact material. The apparatus includes an external pressure shell and internals including supports for the contact material, baffles and conduits for gaseous reactants and products and conduit through which the contact material may be withdrawn and replaced, the foregoing being of a size and design which permits inspection of the internals and replacement of contact material without removal of the internals from the external pressure shell.

---

The present invention relates to apparatus for effecting exothermic gaseous reactions in the presence of a subdivided contact material under conditions of elevated temperature and pressure. More particularly, the invention relates to an improved configuration of apparatus adapted for use in processes such as the synthesis of ammonia from its elements or of methanol from hydrogen and carbon monoxide. By way of illustration, apparatus in accordance with the present invention particularly suited for use in the synthesis of ammonia will be described and illustrated, but it is to be understood that the present invention is not limited to apparatus for ammonia production.

Apparatus for effecting catalytic gaseous synthesis of ammonia, hereinafter referred to as ammonia converters or more briefly, converters, generally consist of the following: an outer shell capable of withstanding substantial internal pressures, for example, up to 1000 atmospheres or more, an inner shell or basket mounted within the outer shell and spaced from the wall of the outer shell to provide an annulus therebetween, a shell-and-tube-type heat exchanger (called an "interchanger") positioned in the bottom of the inner shell, and a plurality of spaced beds of catalyst positioned above the interchanger. Relatively cool reactant gases flow under pressure through the annular space between the outer and inner shells, thereby cooling the outer shell, thence through one side of the interchanger in indirect heat exchange with hot reacted gases, thereby becoming preheated, thence upwardly through a center pipe which extends through the catalyst beds, thence downwardly through the catalyst beds in series, wherein exothermic reaction of a portion of the reactant gases to form ammonia takes place, thence downwardly through the other side of the interchanger in indirect heat exchange with relatively cool, incoming reactant gases, and finally out through the outer shell to product recovery means. Temperature control of the reacting gases as they pass through the catalyst beds may be effected by one or more of several arrangements, one, for example, being the use of quench gas headers between the catalyst beds through which relatively cool reactant gases can be flowed to lower the temperature of the reactant mixture heated by the exothermic conversion reaction.

Ammonia converters of the type described require periodic inspection and maintenance, particularly of the elements of the interchanger, as well as occasional replacement of catalyst. For this purpose the outer shell is provided with a demountable top closure assembly of sufficient size to permit removal of the inner basket and all of its internals as a unit, using suitable hoisting equipment. When the inner basket and internals are thus withdrawn, catalyst can be replaced and any required repairs made to the interchanger or other internals. Since commercial ammonia converters are large and subject to high differential pressures and wide temperature ranges, the top closure assembly must be carefully designed and fabricated to precise tolerances to provide an efficient gas seal.

The foregoing converter design, although generally effective for relatively small, high pressure converters is deficient in respect to the heat exchange characteristics of the interchanger. The interchanger, positioned as it is beneath the lowest catalyst bed, is perforce of "squat" design, i.e., relatively short in relation to its diameter. The relatively large diameter results in low shell side gas velocities which can be offset to a certain extent by providing suitable shell side baffles. However, in order to obtain the required heat exchange area, tubes of relatively large diameter or a larger number of relatively small diameter tubes are required and this results in low tube side gas velocities and concomitant reduction in heat transfer coefficient. Despite this shortcoming, the foregoing converter design is practical and effective for capacities of up to about 150 tons of ammonia per day, or perhaps somewhat more if the synthesis reaction is carried out at a pressure of at least about 5000 p.s.i.g. However, for the larger capacity converters currently required (installations requiring capacities of a thousand or more tons of ammonia per day are now commonplace), or for synthesis operations carried out at comparatively low pressures of, for example, approximately 2000 p.s.i.g., the foregoing converter design has several serious shortcomings. High capacity or low pressure operation or a combination of these characteristics requires considerably greater volumes of catalyst than does relatively low capacity and/or high pressure operation. This in turn increases the size and weight of the inner shell and all of its internals to a point where it is impractical to provide sufficient hoisting capacity to remove the entire inner shell and its load of catalyst for inspection, maintenance and catalyst loading and unloading. Furthermore, the diameter of the converter is so increased that it is nearly impossible to fabricate a conventional top closure assembly large enough to pass the internals which will also provide an effective gas seal under the range of temperature and pressure conditions encountered in the course of operation.

Another problem precipitated by the increased size of ammonia converters is the greater thermal expansion of the inner basket in relation to the outer pressure shell. The differential in expansion is caused by the cool inlet gas flowing through the annulus and maintaining the pressure shell at a lower temperature than the temperature of the basket which is heated from within by the exothermic reaction of the reactant gases. The expansion differenial between the basket and the shell of course is greater for large converters than it is for smaller converters and requiries the provision of flexible mounting means for supporting the basket within the shell and for flexible connections between the basket and the shell.

It is therefore a principal object of this invention to provide an improved apparatus for effecting catalytic, exothermic gaseous reactions at elevated pressures which is particularly suitable for carrying out such reactions on a large scale.

Another object of the invention is to provide an ammonia converter adapted to receive and discharge catalyst without removal of internals.

Still another object of the invention is to provide an ammonia converter from which the interchanger can be separately and conveniently withdrawn for inspection and maintenance.

Yet another object of the invention is to provide an ammonia converter having an improved interchanger configuration allowing improved heat transfer.

Various other objects and advantages of the invention will be apparent to those skilled in the art from the following detailed discussion and description taken with the accompanying drawings in which.

A converter designed in accordance with the invention consists essentially of a cylindrical pressure shell containing a basket within which a reaction zone including one or more beds of subdivided contact material is contained. The basket is spaced from the shell to form an annulus between it and the shell, and the shell contains inlet means for passing reactant material into the annulus. A core member containing an interchanger is positioned within the shell, one end of the core member being in flow communication with the upper end of the reaction zone. Heat exchange tubes within the interchanger are connected in flow communication with the lower end of the reaction zone by tube or conduit means thus permitting the reacted material to pass from the reaction zone through the interchanger tubes and then through suitable outlet means for withdrawal from the reactor vessel.

Sealable openings are provided in the shell and in the basket to permit access to the contact, i.e., catalyst, material bed supports for inspection and maintenance as well as for loading and unloading catalyst and to permit withdrawal of the interchanger for inspection and maintenance. In contrast to converters designed in accordance with the prior art these sealable openings need not, and generally will not, be large enough to pass the entire basket therethrough. This makes it possible to fabricate a sealable shell opening to tolerances which will provide an effective gas seal for the temperatures and pressures encountered during operation.

Figure 1A:
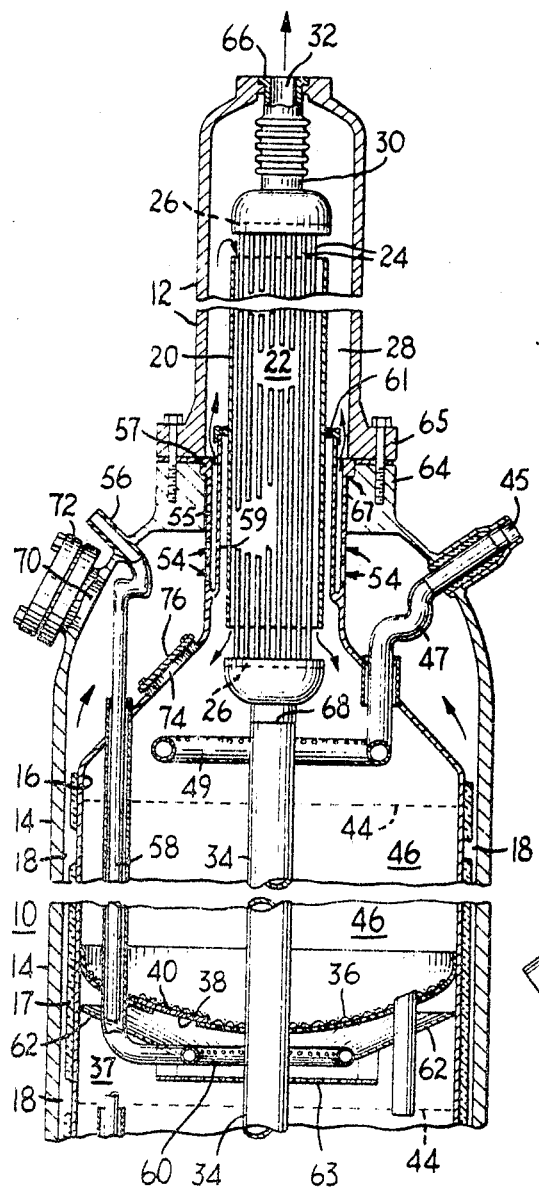
FIGURE 1A is the upper portion and FIGURE 1B the lower portion of a cross sectional view in elevation of a preferred embodiment of the invention.
Figure 1B:
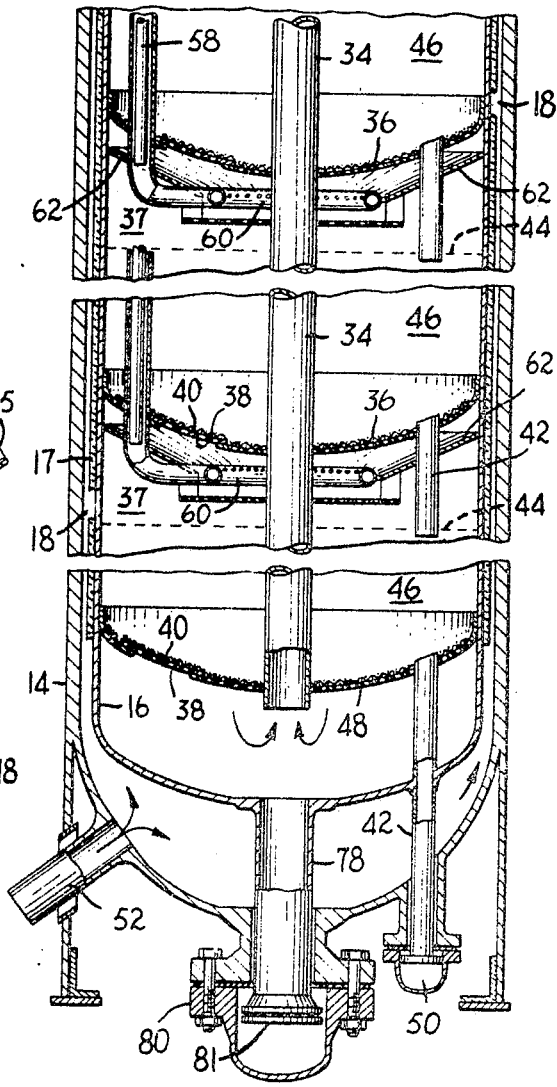

Referring now to FIGURES 1A and 1B, the converter cylindrical pressure shell 10 consists of an upper portion 12 and a lower portion 14. The upper and lower portions of the pressure shell are sealably joined to each other by means of bolted flanges 65 and 64. The opening between the upper and lower pressure shells is large enough to pass the interchanger therethrough yet is not so large that efficient sealing surfaces cannot be fabricated to provide an effective gas seal under the operating pressures encountered. Cylindrical basket 16 is mounted within and spaced from the shell lower portion 14 to form lower annulus 18. Cylindrical basket 16 is covered by thermal insulation layer 17. Core member 20 forms the shell of a shell and tube heat exchanger, hereafter referred to as interchanger 22, consisting essentially of the aforementioned core and interchanger tubes 24 mounted in tube sheets 26. Upper annulus 28 is formed between core 20 and shell upper portion 12. Upper tube sheet 26 is fixed in outlet means 30 so that gases emerging from interchanger tubes 24, i.e., the reacted materials side of interchanger 22, are withdrawn from the converter via outlet 32. Lower tube sheet 26 is mounted in the top of tube member 34 which extends downwardly through the center of basket 16. Within basket 16 are a plurality of catalyst bed supports 36 and a lowest catalyst bed support 48, fashioned of a foraminous material, the apertures of which are sized so that subdivided contact material, i.e., beds of ammonia synthesis catalyst, may be supported thereon. The plurality of catalyst beds 46 and the interspaces 37 between them constitute a reaction zone contained within basket 16. Each support has an opening 38, large enough to permit the passage of a man therethrough during maintenance of the unit. A removeable cover 40, made of foraminous material, is in place, as shown, during operation. Each support is further provided with a downcomer pipe 42 which extends downward and, in all cases but that of the lowest support, to below the normal level of catalyst in the support immediately below. The level of subdivided catalyst material in each bed is indicated by dotted line 44. Downcomer 42 leading from lowest support 48 extends through the basket 16 and the cylindrical shell 14 and terminates in a plug 50.

Cylindrical shell 14 is provided with an inlet 52 for cold reactant gases. The cold gases pass upwards through lower annulus 18 and pass through openings 54 in outer wall 55 of the neck of basket 16. The double wall construction of the neck of basket 16 provides two surfaces, an inner support surface to support core member 20 on basket 16 and an outer bearing surface to bear on cylindrical shell lower portion 14 and thus provide support for basket 16. The top edge of inner wall 59 supports and is welded to lip 61 of interchanger core 20. Lip 57 formed on outer wall 55 provides a surface to bear on the recessed bearing surface 67 of cylindrical shell lower portion flange 64. The inner basket is thus suspended at a single point within the shell and thermal expansion of the basket relative to the shell is taken up in the space between the bottom of the basket and bottom of the shell.

As aforesaid, outer wall 55 is provided with openings 54 to permit passage of the cold gases from lower annulus 18. The cold gases then flow between outer wall 55 and inner wall 59, then through upper annulus 28 around core member 20, then downward into core member 20, i.e., into the reactant materials side of interchanger 22, wherein the gases are heated by indirect heat exchange with hot reacted gases flowing upward in tubes 24. It should be noted that the length and other dimensions of interchanger 22 are not limited by the space available beneath the last catalyst bed as would be the case if the interchanger were positioned within the basket beneath the last catalyst bed as is usual with apparatus designed in accordance with the prior art. In accordance with the present invention the design of the interchanger is largely freed of considerations other than those of obtaining maximum economical heat transfer. The interchanger may therefore be of a length which permits sizing the interchanger tubes 24 to provide for high tube side gas velocities and consequently improved heat transfer characteristics by providing relatively long, small diameter tubes. The heated reactant gases emerge from the bottom of core member 20, i.e., the reactant gas side of interchanger 22, and pass downward through the first catalyst bed the top of which is indicated by dotted line 44. Inlet 45 and pipe 47 lead to hot startup header 49 through which preheated gases may be flowed during start-up, i.e., before sufficient heat of reaction is released to make the reaction self-sustaining. A portion of the gases in contact with the catalyst react exothermically to form ammonia and the mixture of reactant and reacted gases progresses down through the subsequent catalyst beds. Too high a temperature within the reaction zone is harmful to ammonia synthesis catalysts and may damage the catalyst requiring its replacement. In order to control the temperature of the reacting gases cold reactant gas is introduced via inlet 56 and line 58 into quench gas headers 60 located after each catalyst bed but the last. The quantity of cold gases thus introduced is controlled to maintain optimum temperatures within the reacting gas mixture.

The solid columns of catalyst in the downcomer pipes provide substantially more resistance to the gas flow than do the interspaces between the catalyst beds; therefore substantially all the gases follow the desired passage between the catalyst beds wherein they are mixed with cold reactant quench gas to regulate the temperatures within the converter, and only an insignificant portion, if any, of the total gas flow passes through the downcomer pipes. In order to insure thorough mixing of the quench and reactant gases baffles 62 are placed adjacent to quench headers 60. The baffles are mounted within the reaction zone essentially perpendicular to the flow of reacting gases passing therethrough. A preferred embodiment of the baffle, as shown, consists essentially of an inverted, truncated, hollow cone placed with its base perpendicular to the direction of gas flow. In cross section the plane of the baffle surface is seen to be inclined away from normal in the direction of the gas flow. The baffle is provided with an orifice through which the reacting gases pass. The limited cross sectional area of the orifice constricts the flow of the gases passing therethrough and brings the hot reactant gases and the cool quench gas into intimate contact to promote good mixing. Distribution plate 63 is placed downstream of the baffle orifice in order to redistribute the gases evenly over the following catalyst bed. The reacted gases emerge from the last catalyst bed and pass upwardly through tube 34, thence into interchanger tubes 24 where the hot gases are cooled by indirect heat exchange with incoming reactant gases, as aforesaid. The reacted gases pass through outlet means 32 out of the converter.

Performance of maintenance of the reactor internals, or replacement of catalyst, or both is accomplished without necessity or removing the entire basket, as is required with converters designed in accordance with the prior art. In order to remove interchanger 22 for inspection and maintenance, cylindrical shell upper portion 12 must be removed from the shell lower portion 14. This is accomplished by unbolting shell upper portion flange 65 from shell lower portion flange 64 and removing outlet packing gland 66. Thus freed, shell upper portion 12 can be raised and removed. Tube member 34 is then cut at its weldline denoted by dotted line 68 and core member 20 is cut from support lip 61, after which the entire interchanger 22 may be raised and removed from the reactor vessel. Access to the weldline is gained via manhole 70 in the cylindrical shell lower portion and manhole 74 in the basket. The cylinder and basket manholes are sealed by removeable manhole covers 72 and 76 respectively. These manholes and the manholes 38 in each catalyst support provide access, when the converter is emptied of catalyst, to the internals for inspection and maintenance.

The same access means, i.e., manholes 70 and 74, are used as entrance ways to introduce fresh catalyst onto the emptied supports. Catalyst is passed by bucket or flexible tube means through manholes 70 and 74 thence downwardly through manholes 38 from which the covers 40 have been removed, to the lowest catalyst support 48. The lowest catalyst support is loaded first. After the bed is filled with the proper quantity of catalyst, a man is let down through the same passageway through which the bucket or flexible tube means passes and rakes and shovels the catalyst to distribute it uniformly throughout the bed. This procedure is repeated, working upwards, for each catalyst bed.

Removal of spent catalyst is accomplished in two stages. First, the bulk of the catalyst is allowed to flow by gravity through the downcomer pipes 42. This is accomplished by removing plug 50 from bottom downcomer pipe 42 and permitting the catalyst to flow by gravity out of the converter. The catalyst flows from each support to the one next below and so on to the last support then out of the converter. In this manner the bulk of the catalyst flows out by gravity leaving behind only that portion trapped on the lower portion of each support because of the location of the downcomers and the angle of repose of the catalyst material. The second stage of removal, i.e., removing the trapped catalyst, requires that a man enter the converter and is accomplished by shovelling the catalyst down through the successive downcomer pipes.

It is apparent that for loading and unloading catalyst, it is not necessary to remove the upper shell portion or the interchanger, but that access to the interior of the vessel may be had by means of the manhole openings 72, 74 and 38 even with the interchanger and shell upper portion in place. However, in case of an emergency condition whereby catalyst removal by the method described above is not possible, as where, for example, the catalyst cakes and will not flow through the downcomers, tube member 34 may be removed, after removal of the interchnager, by pulling the tube bodily upward and out of the converter. The tube is slip-fitted in the center holes in each catalyst support and is not welded or otherwise fastened thereto. The center holes may then be used as an alternative dumping means for the catalyst, the catalyst being removed through conduit 78 after removal of plug 80 and blind flange 81.

Figures 2A, 2B:
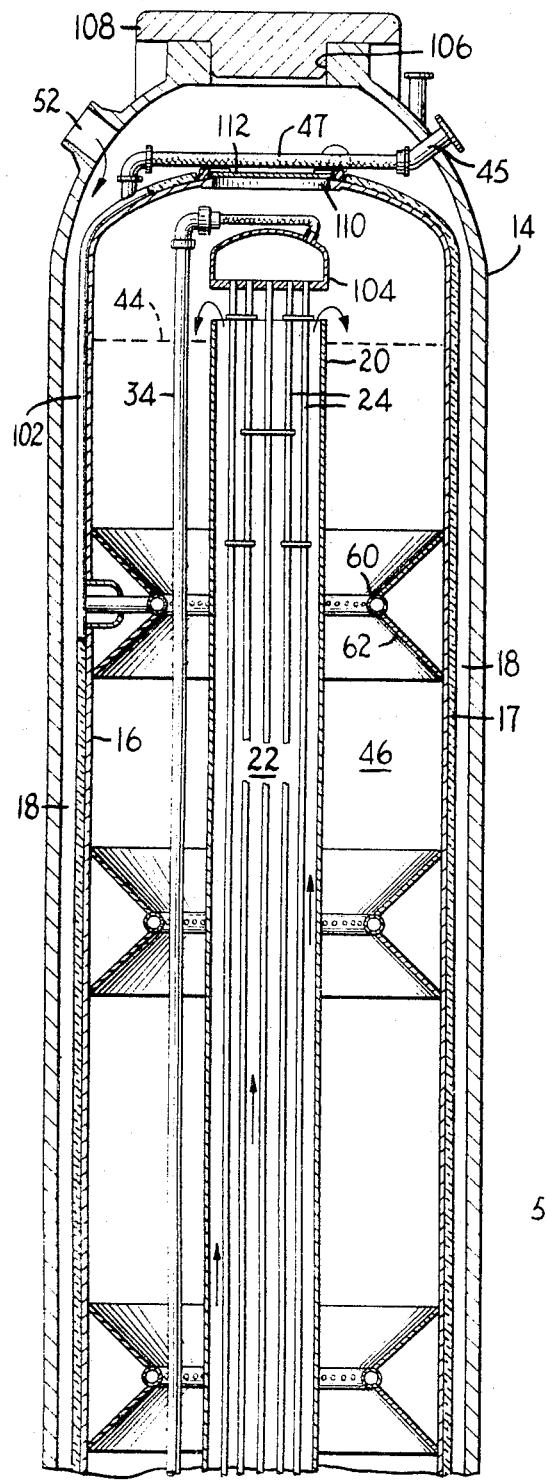
FIGURE 2A is the upper portion and FIGURE 2B the lower portion of a schematic representation of a cross sectional view in elevation of another embodiment of the invention.

Referring now to FIGURES 2A and 2B, the elements of the reactor illustrated in FIGURES 2A and 2B are numbered identically so far as possible to corresponding elements of the reactor illustrated in FIGURES 1A and 1B. Converter cylindrical pressure shell 14 encloses a cylindrical basket 16 and annulus 18 is formed therebetween. Cylindrical basket 16 is covered by thermal insulation layer 17. Core member 20 is contained entirely within basket 16 and passes through the reaction zone formed within basket 16 by a single bed of subdivided contact material, i.e., ammonia synthesis catalyst, the top surface of which is indicated by dotted line 44, and which is supported on foraminous bed support 48. Cold reactant gases are introduced via inlet 52 and pass down annulus 18 then through openings 100 in the bottom of core member 20. The reactant gases then flow upwardly through the reactant materials (shell) side of interchanger 22 wherein they are heated by indiricet heat exchange with hot reacted materials contained in tubes 24. The thus preheated reactant gases flow out the top of core member 20 downward through the single catalyst bed 46. As the reactant gases pass through the catalyst, the exothermic conversion reaction takes place and the temperature of the gases increases. Cold reactant quench gas is introduced via inlet 45 and line 47 and then passes downwardly through conduit 102 which is located outside the basket in annulus 18 and is preferably flattened so that it conveniently fits into the limited annular space. Conduit 102 supplies cold quench gas to quench ring header 60 which is imbedded within the bed of subdivided contact material. Line 47 supplies other flattened conduits (not shown for the sake of simplifying the drawing) identical to conduits 102, which supply the other ring headers. These flattened conduits are positioned within the annulus 18 which is maintained at relatively constant low temperatures by the cooling effect of the cold reactant gases being introduced therethrough. Hence conduits 102 are not subjected to the high temperatures developed inside the basket during the exothermic conversion reaction and thermal expansion of the conduits, which would stress the imbedded quench gas headers against the mass of surrounding catalyst, is minimized. Minimizing thermal expansion of the quench gas conduits by positioning them in the relatively cool annulus is particularly advantageous in a single bed converter of large size since the depth of the catalyst bed requires long quench gas conduits, which if located within the catalyst bed, would be subject to inordinate amounts of thermal expansion with corresponding stress on the connection to the quench gas header imbedded in the catalyst mass. Placing the conduits in the annulus also eliminates the necessity of thermally insulating them as would be required if they passed through the catalyst bed.

Baffles 62, which in this preferred embodiment of the invention are preferably of essentially "hour-glass" configuration, are placed adjacent to each quench gas header in order to constrict the flow of reactant and quench gases and to bring the gases into intimate contact in a zone of increased linear gas velocity to promote good mixing and distribution of the gases. After emerging from the bottom of catalyst bed 46 through foraminous bed support 48, the hot reacted gases pass upwardly through return conduit 34 into interchanger head 104, thence downwardly through tubes 24 in indirect heat exchange with incoming reactant gases as aforesaid. The reacted gases are withdrawn via conduit 31 positioned in outlet 32.

Interchanger 22 may be removed for inspection and maintenance via pressure shell sealable opening 106 and basket sealable opening 110, which are sealed during operation by removeable covers 108 and 112 respectively. These same openings provide access to the converter internals for repair and maintenance crews. The bulk of the spent catalyst is removed from the converter by gravity flow through downcomer 42 after removal of plug 50. Residual catalyst trapped on the bed support may be shoveled out by a man lowered into the reactor. In case of an emergency condition such as caking of the catalyst whereby it will not flow through the limited downcomer opening, an alternative means of catalyst removal is available by removing cover 114 from large diameter opening 116 in core member 20, after removal of interchanger 22. The catalyst then flows by gravity through large diameter opening 116 thence through outlet 32. Fresh catalyst is loaded into the converter by introducing it via sealable openings 106 and 110 and filling the bed to the required level.

This particular embodiment of the invention, i.e., having the interchanger positioned within the basket, results in an apparatus shorter and of larger diameter than one of equivalent capacity designed in accordance with the preferred embodiment illustrated in FIGURES 1A and 1B. The shortened height is the result of placing the interchanger within rather than above the reaction zone, and the large diameter is required to compensate for the catalyst volume displaced by the interchanger passing through the catalyst beds.

The above descriptions represent but two preferred embodiments of the invention. It is apparent that many configurations other than those disclosed above are possible within the scope of the invention which, in general terms, embraces but is not limited to an apparatus for effecting catalytic gaseous reactions at elevated pressures designed so as to eliminate the necessity of removing the basket or other internals of the converter in order to replace catalyst or perform inspection and maintenance services. Generally, this objective is attained by designing a reactor in accordance with the present invention so that the interchanger may be conveniently removed separately from the other internals, catalyst may be emplaced and removed largely by gravity flow, and access to the interior of the out-of-service reactor may be had by a maintenance crew.

As aforesaid, many configurations other than those disclosed in the description of preferred embodiments of the invention illustrated in FIGURES 1A and 1B and 2A and 2B are possible within the scope of the invention. For example, it is apparent that the choice of use of a single catalyst bed or of a plurality of catalyst beds in the reaction zone formed within the basket is not dictated by whether the interchanger is positioned within or above the reaction zone but is equally available to any design option provided by the invention. It is also apparent that many modifications may be made in the design of the particular apparatuses described without departing from the scope of the invention.

What is claimed is:

1. A reactor vessel comprising a normally vertically disposed cylindrical shell, a cylindrical basket vertically positioned within and spaced from said shell, defining an annulus between said shell and said basket and defining a reaction zone within said basket including a section adapted to contain at least one bed of subdivided contact material, inlet means in said cylindrical shell for passing reactant material into said annulus, a generally vertical core member within said shell having one end in flow communication with said annulus and the other end in flow communication with the upper end of said reaction zone, heat exchange means positioned within said core member above said at least one bed of subdivided contact material so as to be severable and upwardly removable from said vessel without disturbing said bed, said heat exchange means being adapted to transfer heat between reactant and reacted materials, a sealable opening in said cylindrical shell sized to permit withdrawal of said heat exchange means, to provide access for a man, and to preclude withdrawal of said basket, conduit means providing flow communication between the lower end of said reaction zone and the reacted materials side of said heat exchange means, and outlet means in said vessel for withdrawal of reacted material from said heat exchange means.

2. A reactor vessel in accordance with claim 1 having a reaction zone adapted to contain a single bed of subdivided contact material on a foraminous bed support, a plurality of quench gas inlet headers contained within said bed of subdivided contact material and positioned throughout said bed vertically one above the other, quench gas conduit means passing through said annulus and in flow communication with said quench gas headers, at least one sealable opening in the bottom of said cylindrical shell provided with a retaining plug and adapted to pass by gravity the bulk of subdivided contact material from said reactor vessel upon removal of said retaining plug.

3. A reactor vessel in accordance with claim 2 having baffle means positioned within said bed of subdivided contact material adjacent to each quench gas header to constrict the flow of gases passing through said bed and to bring the reactant gases and quench gases into intimate mixing contact.

4. A reactor vessel in accordance with claim 1 having a reaction zone adapted to contain a plurality of beds of subdivided contact material on individual foraminous bed supports positioned vertically one above the other, each of said supports having a covered opening sized to admit a man therethrough, a sealable basket opening in the top of said cylindrical basket, said basket opening being sized and positioned to permit withdrawal of said interchanger therethrough, and thence through said shell opening and to provide access for a man into said reactor vessel, at least one vertical downcomer pipe positioned in each of said supports and in the case of each but the lowest of said supports extending downwardly therefrom into the mass of subdivided contact material supported by the next lowest of the plurality of supports, said downcomer pipe in said lowest support extending downwardly therefrom through said basket and said cylindrical shell and being sealed by a plug at the pipe end external the reactor vessel, said downcomer pipes being sized and positioned to pass by gravity the bulk of said subdivided contact material from any bed support to the next lowest support and thence out of said reactor vessel when said plug is removed.

5. A reactor vessel in accordance with claim 4 having a quench gas inlet header below each foraminous bed support but the last and having baffle means located adjacent each of said quench gas headers, said baffle means being positioned so as to constrict the flow of reactant and quench gases passing between adjacent catalyst beds and to bring said reactant and quench gases into intimate mixing contact.

6. A reactor vessel comprising a normally vertically disposed cylindrical shell having an apertured upper portion and an apertured lower portion sealably joined to each other, so that said upper and lower portion are in flow communication through a joint aperture, a cylindrical basket positioned within and suspended from the upper portion of said shell lower portion and spaced from said shell lower portion defining a lower annulus between said shell and said basket and defining a reaction zone within said basket adapted to contain at least one bed of subdivided contact material on at least one foraminous bed support, said basket being sized in relation to said joint aperture to preclude removal of said basket from said shell lower portion through said joint aperture inlet means in said cylindrical shell lower portion for passing reactant material into said lower annulus a generally vertical core member positioned essentially within and spaced from said shell upper portion defining an upper annulus between said shell and said core member, said core member being in flow communication with the upper end of said upper annulus and the upper end of said reaction zone, heat exchange means positioned within said core member so as to be severable and upwardly removable from said vessel without disturbing said bed, said heat exchange means being adapted to transfer heat between reactant and reacted materials, tube means positioned within said basket in flow communication with the lower portion of said reaction zone and the reacted materials side of said heat exchange means, outlet means in the top of said cylindrical shell for passing reacted material from said heat exchange means out of said reactor vessel.

7. A reactor vessel in accordance with claim 6 having a reaction zone adapted to contain a single bed of subdivided contact material on a foraminous bed support, a plurality of quench gas inlet headers contained within said bed of subdivided contact material and positioned throughout said bed vertically one above the other, quench gas conduit means passing through said lower annulus and in flow communication with said quench gas headers, at least one sealable opening in the bottom of said cylindrical shell provided with a retaining plug and adapted to pass by gravity the bulk of subdivided contact material from said reactor vessel upon removal of said retaining plugs.

8. A reactor vessel in accordance with claim 7 having baffle means positioned within said bed of subdivided contact material adjacent to each quench gas header to constrict the flow of gases passing through said bed and to bring the reactant gases and quench gases into intimate mixing contact.

9. A reactor vessel in accordance with claim 6 having a reaction zone adapted to contain a plurality of beds of subdivided contact material on individual foraminous bed supports positioned vertically one above the other, each of said supports having a covered opening sized to admit a man therethrough, a sealable shell opening in said cylindrical shell and a sealable basket opening in said cylindrical basket, said sealable openings being respectively of a size to provide access for a man into said reactor vessel, said basket opening being positioned above the topmost surface of said beds of subdivided contact material and said shell opening being positioned to permit access to said basket opening, at least one vertical downcomer pipe positioned in each of said supports and in the case of each but the lowest of said supports extending downwardly therefrom into the mass of subdivided contact material supported by the next lowest of the plurality of supports, said downcomer pipe in said lowest support extending downwardly therefrom through said basket and said cylindrical shell and being sealed by a plug at the pipe end external the reactor vessel, said downcomer pipes being sized and positioned to pass by gravity the bulk of said subdivided contact material from any bed support to the next lowest support and thence out of said reactor vessel when said plug is removed.

10. A reactor vessel in accordance with claim 9 having a quench gas inlet header below each foraminous bed support but the last and having baffle means located adjacent each of said quench gas headers, said baffle means being positioned so as to constrict the flow of reactant and quench gases passing between adjacent catalyst beds and to bring said reactant and quench gases into intimate mixing contact.

11. A reactor vessel comprising a normally vertically disposed cylindrical shell, a cylindrical basket vertically positioned within and spaced from said shell, defining an annulus between said shell and said basket and defining a reaction zone within said basket including a section adapted to contain at least one bed of subdivided contact material, inlet means in said cylindrical shell for passing reactant material into said annulus, a generally vertical core member passing through the upper end of said at least one bed of subdivided contact material and having one end in flow communication with said annulus and the other end in flow communication with the upper end of said reaction zone, heat exchange means positioned within said core member so as to be severable and upwardly removable from said vessel without disturbing said bed, and adapted to transfer heat between reactant and reacted materials, a sealable opening in said cylindrical shell sized to permit withdrawal of said heat exchange means, to provide access for a man, and to preclude withdrawal of said basket, conduit means providing flow communication between the lower end of said reaction zone and the reacted materials side of said heat exchange means, and outlet means in said vessel for withdrawal of reacted material from said heat exchange means.

References Cited

UNITED STATES PATENTS

| 1,689,684 | 10/1928 | Reed | 23—289 |
|---|---|---|---|
| 1,943,580 | 1/1934 | Brown | 23—289 |
| 2,391,315 | 12/1945 | Hulsberg | 23—288 |
| 2,512,586 | 6/1950 | Stengel. | |
| 2,886,517 | 5/1959 | Patton et al. | 23—288 X |
| 3,041,150 | 6/1962 | Worn | 23—289 |
| 3,212,862 | 10/1965 | Christensen | 23—289 |
| 3,235,344 | 2/1966 | Dreyer et al. | 23—289 |

JOSEPH SCOVRONEK, Primary Examiner